Figure 5:

(No Model.) 2 Sheets—Sheet 1.
E. THOMSON.
PROCESS OF ELECTRIC WELDING.
No. 438,657. Patented Oct. 21, 1890.
Fig. 1.
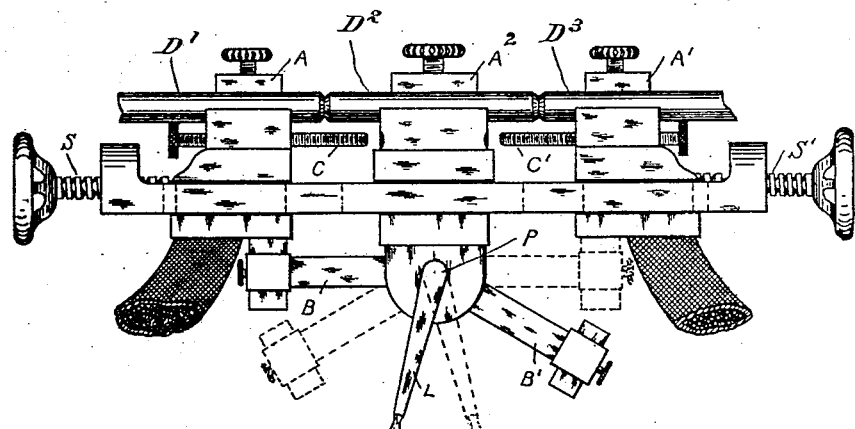
Fig. 3.
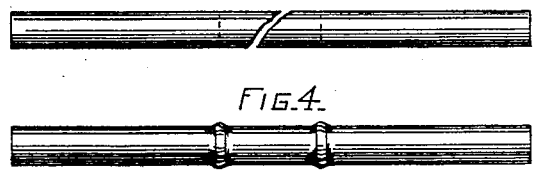
Fig. 4.
Fig. 2.
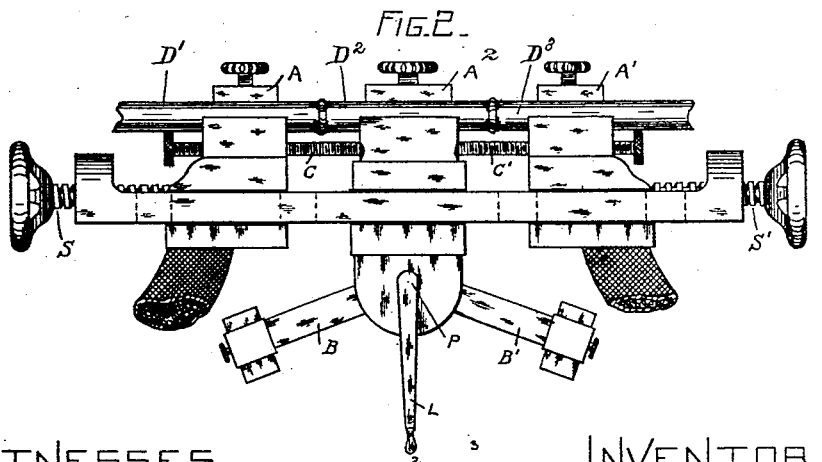
WITNESSES
INVENTOR
Elihu Thomson
By H. C. Townsend
Atty (No Model.)  E. THOMSON.  2 Sheets—Sheet 2.
PROCESS OF ELECTRIC WELDING.

No. 438,657.  Patented Oct. 21, 1890.

WITNESSES  INVENTOR

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

PROCESS OF ELECTRIC WELDING.

SPECIFICATION forming part of Letters Patent No. 438,657, dated October 21, 1890.

Application filed June 14, 1890. Serial No. 355,501. (No model.)

*To all whom it may concern:*

Be it known that I, ELIHU THOMSON, a citizen of the United States, and a resident of Swampscott, in the State of Massachusetts, have invented a certain new and useful Process of Electric Welding, of which the following is a specification.

My invention relates to the process of electric welding, and is especially useful in the welding of bars, rods, pipes, &c.

One of the objects of my invention is to facilitate the operation of welding three or more pieces together.

Another purpose is to facilitate the production of welded objects of a predetermined length and to permit broken rods, bars, or other metal pieces to be mended by the electric-welding process without altering their length.

My invention consists in the improved process of electrically welding three or more pieces together by placing said pieces in abutment with one another in the desired relation, passing current through the joints until they assume the desired welding temperature, and welding the joints, as hereinafter described.

In carrying out this invention I preferably pass the electric current across the several joints by including them in series with one another in a circuit which passes from a terminal piece of the three or more pieces to be joined to and through the intermediate piece or pieces and out by the other terminal piece. It is, however, possible in some classes of work to pass the current through the joints for heating them to welding temperature by making the terminal pieces one pole of the circuit and making an intermediate piece the opposite pole, the current in such case flowing through the two joints to be formed in multiple.

My invention is especially applicable to the joining of three or more pieces in line with one another, as in lengthening bars, rods, or pipes, or in interposing Y or T joints in bars or pipes. In carrying out my invention I preferably pass the current in series through the pieces and the intermediate joints or places of proposed union until they are all heated at once to the welding temperature, and then apply end pressure in a line joining the several pieces, so as to effect a weld at all joints at practically the same time.

My invention consists, further, in mending broken bars, rods, or other metal pieces by the electric-welding process, without altering their length, by interposing between the two parts to be joined a piece of metal, which shall be included in the heating-circuit and softened and has sufficient surplus metal to compensate for the metal taken up in the burr or upset material produced by the end pressure used in the welding. In mending broken bars, rods, &c., the broken ends may be left intact in some cases, in which instances but a comparatively small piece of metal need be interposed. In other cases the broken ends may be cut off, when the interposed piece will have to be correspondingly longer, its length being determined by the length of the pieces removed plus the length of such pieces and of the intermediate piece itself taken up in upset metal by the application of the end pressure used in effecting the weld.

My invention consists, also, in the apparatus and the modifications of the process, as hereinafter described and claimed.

Figure 6:
Figure 7:

In the accompanying drawings, Figure 1 shows a side elevation of an apparatus suitable for use in practicing my invention. Fig. 2 shows the same apparatus in another position. Figs. 3 and 4 show an example of work to which my invention is applicable. Figs. 5, 6, and 7 illustrate the several stages of operation in the process of electric welding as practiced prior to my invention. Figs. 8, 9, 10, 11, and 12 illustrate other applications of my improved process.

Referring to Figs. 1 and 2, $D'$ $D^2$ $D^3$ indicate three sections of bar, rod, or pipe which are to be welded together into a single piece. A, A', and $A^2$ show the clamps or holders for fastening or holding the three several pieces assembled in proper relative position with their ends in contact. The several clamps A A' $A^2$ may be mechanically constructed in any desired way. They are shown as severally mounted upon a suitable base-plate in proper manner, so as to be insulated from said plate and from one other.

In the apparatus which I have herein shown as adapted to carry out my invention the two clamps A A', which hold the outside pieces D' D³, are shown as the poles of the circuit, the current being by such an organization caused to pass in series through the three pieces for the purpose of heating the two joints.

S S' are screws by which the clamps A A' and the pieces borne by them may be forced toward the intermediate clamp and pieces.

I preferably employ in connection with the apparatus suitable means for shunting the current from either of the joints at pleasure to regulate the heating. A switch proper for the purpose consists of two arms B B', made of good conducting material and mounted in electrical connection with the base of clamp A². L is a lever secured to the pivot or rock shaft carrying the arms B B' and adapted to turn said arms so as to cause either one or the other at pleasure to make contact with the base of the clamp A or A'. The several bars being firmly clamped in position, as shown, and the current turned on, the metal at and near the joints will be caused to heat by the passage of current across them. If the joint between the pieces D' D² should heat too rapidly, the switch device may be turned so as to shunt current away from such joint, allowing the current to pass through the other joint, so as to permit the latter to heat while the heating of the first is temporarily suspended. Should the parts heat practically coequally, the switch-lever L may be left in the intermediate position during the heating operation. When the desired heat has been reached, the clamps A' A are forced toward the intermediate clamps by the devices S S', thereby producing the welded joint in the well-known manner.

While I have described the current as carried through the pieces in series, it is obvious that it might be passed through the joints and pieces, so as to include the joints in a multiple-arc circuit. This could be readily effected by making the clamps A A' one pole of the electric circuit and by connecting the clamp A² to the other pole in any desired manner.

C C' are stops which are carried by the clamps A A', and by abutting against the clamp A² serve to limit the movement in the welding operation, so as to determine the extent to which the bars shall be shortened by the upsetting of the metal at the joint. In the process of electric welding as practiced prior to my invention there is a tendency to the shortening of the length of the pieces welded, owing to the fact that the metal at the joint is upset or forced out laterally by the pressure applied to the plastic metal. This is illustrated in Figs. 5, 6, and 7, where Fig. 5 shows the two pieces to be welded, Fig. 6 the two pieces in abutment, and Fig. 7 the length of the pieces as welded.

The extent of the shortening of the bar during welding is shown somewhat exaggerated in Fig. 7 to indicate more clearly the result of welding and permitting the upsetting to take place.

In the uniting of the three pieces, as indicated in Fig. 1, it is quite obvious that there would be a resultant shortening of the total length of the bar in the same manner.

In mending broken rods, bars, or pieces of material where it is desirable to preserve the original length it becomes necessary to prevent such alteration of the length in the welding process. To accomplish this object, I insert between the two broken pieces to be welded a supplemental piece having surplus metal adapted to compensate for the amount of material used up in the welding of the pieces together with the intermediate piece between them. Such intermediate piece may be inserted between the broken ends without cutting off such broken ends where the fracture is reasonably uniform in cross-section, and in such case the amount of surplus material provided in such intermediate piece would be only that necessary to compensate for the shortening of the two outside pieces themselves and the intermediate piece in the welding operation. Frequently, however, it is desirable to cut off the broken ends, as at the dotted lines indicated in Fig. 3. The piece then inserted is equivalent in length to the parts removed plus an amount sufficient to make up for the amount lost in the pressing of the three several parts together. The work resulting from such operation is indicated in Fig. 4. The part inserted may be held in the clamp A² and the operation performed in the manner before described. The piece inserted being a trifle longer than that cut out, a finished rod, as shown in Fig. 4, will be produced which will have practically the same length as the original piece before breaking. In the same way when it is necessary to make a complete bar or rod from three pieces, such that the length of the completed article should be of a predetermined length, the intermediate piece inserted may have a surplus length adapted to compensate for the shortening produced in the welding operation.

Figure 8:
Figure 9:
Figure 10:

It is obvious that the inserted piece might be much less in length than indicated in Fig. 4. In many cases it will be only necessary where a predetermined length of bar is to be formed or where the original length of a broken bar or other object is to be preserved to insert a very short length of intermediate piece. This is illustrated in Figs. 8, 9, and 10, where the inserted piece is shown as much larger than is actually necessary for the sake of clearness. It is obvious that in the case of the small piece inserted as shown it may not be necessary to provide an intermediate holding device.

Figure 11:
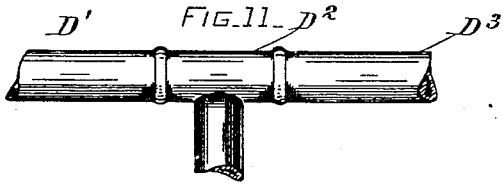

In Fig. 11 the intermediate piece welded to the two others consists of a T-joint. The parts are included in circuit in the manner before described, so that current may be caused to pass across both joints at practically the same time, and the welding may be produced by practically one operation.

Figure 12:
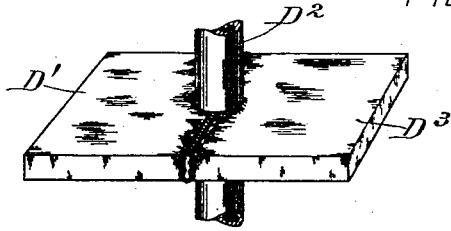

Fig. 12 illustrates the application of my invention to the welding of three pieces, consisting of two plates D' D³ and an intermediate pipe D², that is to be welded into place between them. In preparing the work the groove or recess formed in the edges of the pieces D' D³ where the pipe D² rests must be made somewhat smaller than the diameter of the pipe, so that the edges of the plates will not heat before welding, but will abut against the side of the pipe. When the current is made to flow, the plates will soften upon the pipe and may be then caused to approach by means of proper pressure exerted on them, so that they will be welded upon the pipe. As they approach, the edges of the plates finally come into contact with one another, and a continuation of movement toward them after heating at the edges will result in a welding of the plates themselves together.

It is obvious that in using the apparatus, Fig. 1, the switch might be turned so as to cut off the current from one joint and allow the other to heat to the welding temperature and the proper clamp then moved to weld such joint, immediately after which the switch may be turned into the other position and the same operation performed on the other joint. Whether the manipulation be as just described or as first described in this specification it is obvious that the operation of joining three or more pieces is greatly facilitated, since it is not necessary to disturb the work in the clamps, the three several parts being assembled originally in the position which they are to finally occupy when joined together, and the work of heating and pressing them together to effect the weld being performed as practically one operation. It is obvious, however, that in ordinary cases the work may be done more rapidly by permitting both joints to heat at once and then applying the necessary pressure to both joints at the same time.

In the case of shorter pieces interposed between the ends of a broken bar or rod which is left intact at the point of breakage it is obvious that the heating of both joints would necessarily have to take place at the same time, as the length of the interposed piece will be insufficient to permit it to be clamped and current to be shifted to one joint or the other readily.

What I claim as my invention is—

1. The herein-described improved process of electrically welding three or more pieces together, by placing said pieces in abutment with one another in the desired relation, passing current through the joints until they assume the desired welding temperature, and welding the joints, as and for the purpose described.

2. The herein-described improvement in electrically welding three pieces of metal together, consisting in placing the three pieces in a heating electric circuit from one to the other of the outer pieces, so as to heat both points of union to a welding temperature at the same time, and then applying the pressure or other mechanical force in proper manner to effect the welding.

3. The herein-described improvement in welding breaks in metal rods, bars, &c., by the electric-welding process without altering their length, consisting in interposing between the pieces to be welded an auxiliary piece having surplus material adapted to compensate for the length of metal taken up by the upsetting due to the end pressure.

4. The herein-described improvement in welding a piece of metal into place between two others, consisting in including the interposed piece in an electric circuit from one to the other of the outside pieces, passing an electric current from one of the latter to the other through the interposed pieces, and applying pressure to join the three pieces, as and for the purpose described.

5. The herein-described method of welding three or more pieces of metal together in line, consisting in heating the several points of union by an electric current passing through the material at the joints from one piece to another and applying end pressure while the pieces are in line and are heated to the welding temperature at such points of union.

6. The herein-described improvement in electric welding of three pieces together, consisting in electrically heating the joints in any desired way and effecting the two welds by applying end pressure in a line joining the three pieces while heated and united in line, as and for the purpose described.

7. The herein-described improvement in inserting T's, Y's, &c., in lengths of piping, consisting in placing the T or Y in position between the sections of pipe to which it is to be joined, making the said piece and sections part of an electric circuit, through which current may flow to or from said piece and across both joints, heating the parts to the welding temperature, and then applying pressure to weld both joints.

8. The herein-described improvement in electrically welding three pieces of metal together in line, consisting in clamping the intermediate pieces in a suitable holder, clamping the outside pieces in suitable conducting-holders with their ends abutting against the ends of the intermediate piece, passing an electric current through the joints while the three pieces are assembled in the proper relation, and, after heating of the joints to the desired temperature, effecting the weld, as and for the purpose described.

9. The herein-described improvement in electrically welding three pieces of metal together, consisting in assembling and clamping the pieces in the desired relation, with their parts in contact with one another, heating the joints by passing an electric current from the clamps through the pieces, and effecting a union by the proper pressure or other mechanical force, as and for the purpose described.

10. The herein-described method of electrically welding three or more pieces together, consisting in assembling and clamping the pieces in contact in proper relation and varying the heating at the joints as necessary by electrically connecting the clamps by a shunt around the joint, as and for the purpose described.

11. The combination, in an electric-welding apparatus, of holders or clamps for holding three pieces to be welded together and means for shunting current around either of the two joints at pleasure.

12. In an electric-welding apparatus, the combination, with an intermediate clamp, of the exterior movable clamps, as and for the purpose described.

13. In an electric-welding apparatus, the combination, substantially as described, of the clamp $A^2$ and clamps $A\ A'$, movable to and from the first and provided with suitable adjustable stops, as and for the purpose described.

14. The herein-described improved process of forming two or more electrically-welded joints, consisting in placing the pieces to be joined together in abutment with one another in the desired relation, passing an electric current through the joints until they assume their proper temperature, and then applying the pressure or other mechanical force to effect the weld.

15. The herein-described improvement in electrically welding a piece of metal into place between two exterior masses of metal, consisting in placing the parts in abutment with one another in the desired relation, electrically heating the joints by current passing across them, and then applying end pressure in a line to form the two welded joints at once.

16. The combination, in an electric metal-working apparatus, of three work-holding clamps arranged in line with one another and exterior clamps forming the poles of the apparatus and being provided with suitable devices whereby they may be moved toward the intermediate clamp.

Signed at Lynn, in the county of Essex and State of Massachusetts, this 11th day of June, A. D. 1890.

ELIHU THOMSON.

Witnesses:
J. W. GIBBONEY,
DUGALD MCKILLOP.